Patented June 10, 1930

1,763,579

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE RETARDER

No Drawing.    Application filed March 1, 1928. Serial No. 258,442.

My invention relates to methods of treating rubber and the product formed thereby and it has particular relation to a method of treatment whereby the durability of rubber may be greatly enhanced.

More specifically, the invention has for one of its objects the provision of a material which, when it is incorporated into rubber compounds, inhibits the absorption of oxygen and thus prevents premature loss of elasticity and tensile strength of the rubber.

Another object of the invention is to provide a non-odorous and non-poisonous antioxidant or age-retarder which may readily be incorporated into rubber.

Another object of the invention is to provide an anti-oxidant or age-retarder which is highly efficent in action and which is relatively inexpensive to manufacture.

One difficulty heretofore experienced with rubber compounds has been due to the absorption of oxygen which results in premature loss of elasticity and tensile strength of the compound. It has been proposed to overcome this difficulty by incorporating into the rubber prior to vulcanization a compound which inhibits the absorption of the oxygen. A relatively large number of compounds have been proposed for this purpose, but most of them are more or less unsatisfactory for various reasons. Some of them exist normally only in a liquid state, and for that reason can be incorporated into the rubber only with considerable difficulty. Some of these materials also possess strong and unpleasant odors which render the handling thereof an unpleasant task. Still others are more or less poisonous in their nature and their use in rubber compounds is likely to produce toxic effects upon the workmen employed in handling them.

This invention consists in the discovery that certain amino benzyl alcohols may be readily manufactured and incorporated into rubber compounds as antioxidants or age-retarders with highly gratifying results.

One material of this class is p-($\alpha$-naphthyl amido) benzyl alcohol which may be prepared by the following method.

Dissolve phenyl $\alpha$-naphthylamine in alcohol in the proportions of 16 grams of the amine to 275 cc. of alcohol. Treat this solution with 8.8 grams of hydrochloric acid having a specific gravity of 1.17. The resulting solution should then be treated with 5.45 grams of a forty percent solution of formaldehyde. It may be necessary to warm this solution slightly before reaction takes place. The reaction results in a curdy precipitate which is allowed to stand until precipitation is complete. The precipitate should then be filtered, washed and suspended in alcohol. The alcoholic solution is next treated by making it alkaline with ammonium hydroxide. As a result of the latter treatment, a powder almost white in color and insoluble in alcohol is precipitated.

The same method may be employed in the manufacture of p-$\beta$-naphthyl amido benzyl alcohol by substituting phenyl $\beta$-naphthylamine for phenyl $\alpha$-naphthylamine.

The invention is not limited to the naphthylamido benzyl alcohols as antioxidants but includes also the phenyl amido benzyl alcohols and other alcohols of the class having the formula

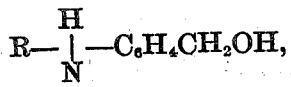

in which R represents a hydrocarbon group.

The substances just discussed may be employed in most of the standard rubber compounds with satisfactory results. The following is an example of a formula which insures a compound having excellent physical characteristics.

| | Parts |
|---|---|
| Acetone extracted rubber | 100 |
| Zinc oxide | 5 |
| Sulfur | 3 |
| Stearic acid | 1.5 |
| Hexamethylene tetramine | 1 |
| Antioxidant | 1 |

Samples of material prepared in accordance with the preceding formula in which the various materials disclosed were employed as antioxidants were subjected to vulcanization. Certain of the vulcanized samples were then subjected to physical tests in order to ascertain their elasticity and tensile strength prior to aging. Other samples of the same material were subjected to artificial aging for a period of six days in an oxygen bomb containing oxygen under a pressure of 150 pounds per square inch and at a temperature of 50° C. The results of these tests are indicated in the following tables:

P-(phenylamido) benzyl alcohol

ORIGINAL

| Cure in mins. | Steam pressure | Stress in kgs/cm² at | | | % Elong. at break | Per cent weight increase |
|---|---|---|---|---|---|---|
| | | 500% elong. | 700% elong. | At break | | |
| 30 | 40 | 15 | 44 | 105 | 865 | --------- |
| 50 | 40 | 22 | 73 | 165 | 835 | --------- |
| 70 | 40 | 29 | 106 | 170 | 780 | --------- |

AGE TEST

| 30 | 40 | 22 | 70 | 105 | 775 | .05 |
| 50 | 40 | 29 | 100 | 130 | 750 | .35 |
| 70 | 40 | 38 | -------- | 120 | 685 | .52 |

P-(α-naphthylamido) benzyl alcohol

ORIGINAL

| Cure in mins. | Steam pressure | Stress in kgs/cm² at | | | % Elong. at break | Per cent weight increase |
|---|---|---|---|---|---|---|
| | | 500% elong. | 700% elong. | At break | | |
| 30 | 40 | 17 | 52 | 140 | 885 | --------- |
| 50 | 40 | 22 | 80 | 165 | 830 | --------- |
| 70 | 40 | 29 | 110 | 190 | 795 | --------- |

AGE TEST

| 30 | 40 | 17 | 61 | 130 | 840 | .12 |
| 50 | 40 | 25 | 90 | 160 | 805 | .11 |
| 70 | 40 | 34 | 124 | 165 | 750 | .14 |

P-(β-naphthylamido) benzyl alcohol

ORIGINAL

| Cure in mins. | Steam pressure | Stress in kgs/cm² at | | | % Elong. at break | Per cent weight increase |
|---|---|---|---|---|---|---|
| | | 500% elong. | 700% elong. | At break | | |
| 30 | 40 | 17 | 50 | 115 | 855 | --------- |
| 50 | 40 | 23 | 83 | 160 | 815 | --------- |
| 70 | 40 | 30 | 115 | 180 | 780 | --------- |

AGE TEST

| 30 | 40 | 18 | 61 | 135 | 855 | .14 |
| 50 | 40 | 26 | 90 | 155 | 790 | .17 |
| 70 | 40 | 33 | 124 | 165 | 750 | .23 |

It will be evident from the preceding description that the invention constitutes a novel and highly satisfactory method for increasing the durability of rubber compounds. The method does not involve the employment of any poisonous or malodorous materials. The compounds employed are also powder-like substances which may be readily and uniformly dispersed throughout a rubber mass.

Although I have described in detail only the preferred forms which the invention may assume, it will be apparent to those skilled in the art that it is not so limited but that various minor modifications may be made therein without departing from the spirit of the invention or from the scope of the appended claims.

What I claim is:

1. A method of treating rubber which comprises incorporating therein an α-naphthylamido benzyl alcohol.

2. A method of treating rubber which comprises incorporating therein a material having the following structural formula:

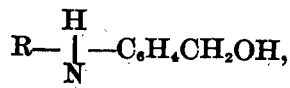

in which R is a radical selected from a group comprising α and β-naphthylene.

3. A method of treating rubber which comprises incorporating therein the reaction product of a phenyl naphthylamine and an aldehyde, and subjecting the resulting compound to vulcanization.

4. A method of treating rubber which comprises incorporating therein a reaction product of phenyl naphthylamine and an aldehyde and subjecting the resulting compound to vulcanization.

5. A method of treating rubber which comprises incorporating therein a reaction product of a phenyl α-naphthylamine and an aldehyde and subjecting the resulting compound to vulcanization.

6. A rubber product that has been vulcanized in the presence of the reaction product of a phenyl naphthylamine and formaldehyde.

7. A rubber product that has been vulcanized in the presence of the reaction product of a phenyl naphthylamine and an aldehyde.

8. A rubber product that has been vulcanized in the presence of the reaction product of a phenyl α-naphthylamine and formaldehyde.

9. A rubber product that has been vulcanized in the presence of the reaction product of a material selected from a group comprising phenyl α-naphthylamine and phenyl β-naphthylamine and formaldehyde.

In witness whereof, I have hereunto signed my name.

Signed at Akron, in the county of Summit and State of Ohio, U. S. A., this 29th day of February, 1928.

ALBERT M. CLIFFORD.